United States Patent
González Böhme et al.

(10) Patent No.: US 12,158,015 B2
(45) Date of Patent: Dec. 3, 2024

(54) WALKING ROBOTIC CELL FOR THE MANUFACTURE OF BUILDINGS PRINTED ON SITE BY MEANS OF A MULTI-AXIS 3D PRINTING SYSTEM; AND METHOD OF OPERATION

(71) Applicant: UNIVERSIDAD TÉCNICA FEDERICO SANTA MARÍA, Valparaíso (CL)

(72) Inventors: Luis Felipe González Böhme, Concón (CL); Rodrigo Hernán García Alvarado, Concepción (CL); Francisco Javier Quitral Zapata, Valparaíso (CL); Alejandro Martínez Rocamora, Concepción (CL); Fernando Alfredo Auat Cheein, Viña del Mar (CL)

(73) Assignee: UNIVERSIDAD TÉCNICA FEDERICO SANTA MARÍA, Valparaíso (CL)

( * ) Notice: Subject to any disclaimer, the term of this patent is extended or adjusted under 35 U.S.C. 154(b) by 235 days.

(21) Appl. No.: 17/782,623

(22) PCT Filed: Dec. 5, 2019

(86) PCT No.: PCT/CL2019/050133
§ 371 (c)(1),
(2) Date: Jun. 3, 2022

(87) PCT Pub. No.: WO2021/108936
PCT Pub. Date: Jun. 10, 2021

(65) Prior Publication Data
US 2023/0016498 A1    Jan. 19, 2023

(51) Int. Cl.
*E04G 21/04* (2006.01)
*B25J 9/00* (2006.01)
(Continued)

(52) U.S. Cl.
CPC ........ *E04G 21/0436* (2013.01); *B25J 9/0084* (2013.01); *B29C 64/00* (2017.08);
(Continued)

(58) Field of Classification Search
None
See application file for complete search history.

(56) References Cited

U.S. PATENT DOCUMENTS

| 10,399,325 | B2 | 9/2019 | Friend |
| 11,207,849 | B2 * | 12/2021 | Berman .................. B25J 11/00 |

(Continued)

FOREIGN PATENT DOCUMENTS

| CN | 109703016 A | 3/2019 |
| CN | 208918302 U | 5/2019 |

(Continued)

OTHER PUBLICATIONS

Aaron Betsky, Walking 3D Printers and Other Creative Architecture Machines, Jan. 10, 2014, Architect Magazine, https://www.architectmagazine.com/technology/walking-3d-printers-and-other-creative-architecture-machines_o (Year: 2014).*

(Continued)

*Primary Examiner* — Benjamin A Schiffman
(74) *Attorney, Agent, or Firm* — Procopio, Cory, Hargreaves & Savitch LLP

(57) ABSTRACT

The present invention relates to a walking robotic cell for the manufacture of on-site printed buildings using a multi-axis 3D printing system, and a method for operating said walking robotic cell. The walking robotic cell comprises a quadruped mobile robotic system acting autonomously and remotely operated, a feeding device, and a multi-axis actuator, which is a reprogrammable electromechanical system, automatically controlled, and programmable offline or online in all its degrees of freedom from an external or remote computer.

14 Claims, 15 Drawing Sheets

(51) Int. Cl.

| | | |
|---|---|---|
| *B29C 64/00* | (2017.01) | |
| *B29C 64/10* | (2017.01) | |
| *B29C 64/106* | (2017.01) | |
| *B29C 64/20* | (2017.01) | |
| *B29C 64/30* | (2017.01) | |
| *B29C 64/379* | (2017.01) | |
| *B33Y 10/00* | (2015.01) | |
| *B33Y 30/00* | (2015.01) | |
| *B62D 57/032* | (2006.01) | |

(52) U.S. Cl.
CPC ............ *B29C 64/10* (2017.08); *B29C 64/106* (2017.08); *B29C 64/20* (2017.08); *B29C 64/30* (2017.08); *B29C 64/379* (2017.08); *B33Y 10/00* (2014.12); *B33Y 30/00* (2014.12); *B62D 57/032* (2013.01)

(56) References Cited

U.S. PATENT DOCUMENTS

| | | | |
|---|---|---|---|
| 2005/0196484 A1* | 9/2005 | Khoshnevis | B28B 1/001 425/463 |
| 2018/0093373 A1* | 4/2018 | Niederberger | B33Y 30/00 |
| 2018/0312023 A1* | 11/2018 | Braithwaite | B25J 15/0028 |
| 2019/0217527 A1 | 7/2019 | Boyd, IV | |
| 2023/0001757 A1* | 1/2023 | Ramezani | B64U 30/20 |

FOREIGN PATENT DOCUMENTS

| | | | | |
|---|---|---|---|---|
| CN | 110253709 A | | 9/2019 | |
| CN | 111761810 A | * | 10/2020 | |
| CN | 107696675 B | * | 3/2021 | ............... B28B 1/00 |
| ES | 2726918 A1 | * | 10/2019 | ............. B05B 13/04 |
| WO | WO-2005070657 A1 | * | 8/2005 | .......... B25J 19/0025 |
| WO | 2016016887 A1 | | 4/2016 | |
| WO | 20161566261 A1 | | 6/2016 | |
| WO | WO-2016145544 A1 | * | 9/2016 | |
| WO | WO-2016156626 A1 | * | 10/2016 | |
| WO | 2018069750 A1 | | 4/2018 | |
| WO | WO-2019197698 A1 | * | 10/2019 | ........... B05B 13/041 |
| WO | WO-2021108933 A1 | * | 6/2021 | |
| WO | WO-2021108934 A1 | * | 6/2021 | |
| WO | WO-2021108935 A1 | * | 6/2021 | |

OTHER PUBLICATIONS

Raibert, Marc, et al. "Bigdog, the rough-terrain quadruped robot." IFAC Proceedings vols. 41.2 (Jul. 11, 2008): 10822-10825. (Year: 2008).*

INAPI. International Search Report Mailed Jul. 8, 2020. International Patent Application No. PCT/CL2019/050133. International Filing Date: Dec. 5, 2019. Spanish Language and English Translation. 6 pages.

* cited by examiner

40

40

WALKING ROBOTIC CELL FOR THE MANUFACTURE OF BUILDINGS PRINTED ON SITE BY MEANS OF A MULTI-AXIS 3D PRINTING SYSTEM; AND METHOD OF OPERATION

FIELD OF APPLICATION

The present invention relates to a walking robotic cell for the manufacture of on-site printed buildings by means of a multi-axis 3D printing system and method of operation, which can move over and between preinstalled reinforcement bars and vertical ducts and which allows to generate multiple helical paths of simultaneous deposition of continuous filaments of a mortar from cement, polymer, biomaterial, or other similar material that does not require formwork to shape it or contain it while it solidifies. More specifically, it relates to a walking robotic cell having on-board power, control, and navigation systems, which can be connected zenithally to an external source of material and alternatively also to external power, control, and navigation systems, which is supported and transported by a quadruped mobile robotic system acting autonomously and remotely operated, and which contains a multi-axis actuator, which is reprogrammable, automatically controlled, and programmable offline or online in all its degrees of freedom from an external or remote computer, and which consists of a circular motion track, with a plurality of carriages on which a plurality of robot manipulators mounted on a plurality of telescopic columns in inverted position move, and on the flange of each robot manipulator an interchangeable nozzle is mounted, which has an electronically controlled shut-off valve, and which is connected to a flexible hose for conveying of materials, which is part of a feeding device through which the mortar that is pumped from the outside of the walking robotic cell descends, to be extruded into filaments that are deposited in successive superimposed layers, according to a previous computational path design that reproduces the inner and outer contour of the building in all its horizontal and vertical extension.

DESCRIPTION OF PRIOR ART

Construction 3D printing, also known as 3D-printing construction, consists of the additive manufacturing of buildings and building components by means of computer-controlled mechanical deposition of filaments of a mortar of a material in a plastic state, generally with high cement content, fine grains of aggregates, usually between 2 and 3 mm in diameter, accelerators, and other specific additives, which reproduces the contour of the piece to be printed, in its horizontal and vertical extension, in successive superimposed layers that adhere to each other consecutively, forming a resistant continuum that solidifies progressively, keeping its shape and position without the aid of formwork. During the initial setting, the time threshold at which each filament of cement mortar adheres best to the lower filament, in successive superimposed layers, without crushing each other too much, or overturning or crumbling, is a crucial parameter in the programming and control of speeds and accelerations of deposition and mortar pumping, especially in the printing of large horizontal extension pieces or enclosures. Naturally, the composition of the mortar, the number of superimposed layers, and their respective weights, are also determining factors in the programming and control of the 3D printing process with cement mortar. Less common, so far, is the construction 3D printing using mortar of polymeric materials, biomaterials, and other composite materials. In the construction 3D printing of complex geometric contours, the shape and orientation of the nozzle through which the mortar is extruded are also fundamental to determine the effective reach of the tool, especially if the piece to be printed contains preinstalled reinforcement bars or ducts, also if the angle formed by the walls of the piece and the floor is different from ninety degrees and, in some cases, also if the objective is to make the output of the mortar filament from the nozzle more expeditious, reducing the friction produced by the vertical orientation of the nozzle. The construction 3D printing process can occur on site, i.e., at the construction site, to manufacture buildings at their final location, or in the factory, to prefabricate building components that will eventually be put into service in a different location from where they were printed. The conventional way to manufacture walls, columns, slab components, and other pieces by 3D printing is to print from the bottom up, layer by layer, the contour of the piece with a continuous mortar filament and the inner contour of the piece with another or the same filament, to form a structuring pattern for the piece. For example, slab components may be prefabricated, preferably in the factory, by printing them in a vertical position, as if they were walls or hollow bricks that are finally flipped to be put into service, laid in their final position and orientation. The printed contour of the piece can also be used to act as a formwork, and once its walls harden and acquire sufficient strength, the inside of the piece can be filled with the same or another appropriate material to improve its mechanical strength, acoustic insulation, or thermal insulation. The mortar in both the contour and inner contour may also contain natural or synthetic fibers to improve its mechanical resistance. In any case, ducts for the supply and extraction of water, electricity, gases, and other media can also be installed before, during, or after the manufacture of the piece, as permitted by the construction 3D printing system used. The same condition applies for the installation of sills and lintels, for example, to form the openings of doors and windows, before or during the 3D printing process of the walls that make up an enclosure. In certain cases, it is necessary to install a reinforcement of steel bars or mesh inside the piece in order to improve its mechanical resistance, especially to the lateral forces produced, for example, by an earthquake. For this purpose, the reinforcement of the piece must be anchored to the foundation, as well as to the adjacent pieces, if any, in order to obtain a resistant continuum, solidly founded to the ground and in solidarity with the rest of the building. In this case, it is crucial to plan in detail the manner and the chronological order in which the piece will be printed and said reinforcement will be installed. Likewise, the choice of the construction 3D printing system to be used is of the utmost importance, especially if it will not be possible to modify the position or orientation of the piece during the 3D printing process, as is generally the case in on-site construction 3D printing.

In general, four types of construction 3D printing systems can be distinguished according to their mechanical structure and working space: Cartesian, cylindrical, parallel, and articulated. The Cartesian system of construction 3D printing essentially consists of a gantry. The links of its kinematic chain are connected by at least three prismatic (translational) joints, each oriented in one of the directions of the X, Y, and Z axes of the Cartesian coordinate system. Its working space has the shape of a rectangular prism (cuboid) and is completely contained by the supporting structure of the construction 3D printing system itself. The conventional nozzle through which the material is extruded moves with three degrees of freedom and only one fixed orientation. The cylindrical system of construction 3D printing essentially consists of a cantilevered swivel arm. The links of its kinematic chain are connected by a revolute (rotational) joint around the vertical Z axis, a prismatic (translational) joint also in the direction of the vertical Z axis, and a prismatic (translational) joint in the direction of one of the horizontal X or Y axes of the Cartesian coordinate system. Its working space has the form of an incomplete cylinder—if the revolute joint around the vertical Z axis does not reach 360 angular degrees—or complete—if the revolute joint around the vertical Z axis does reach or exceed 360 angular degrees—, which partially or completely contains the construction 3D printing system itself. The conventional nozzle through which the material is extruded moves with three degrees of freedom and only one fixed orientation. The parallel system of construction 3D printing, also known as Delta, essentially consists of three concurrent articulated arms. The links of the kinematic chain of each arm are connected by either a prismatic (translational) joint in the direction of the vertical Z axis or a revolute (rotational) joint around one of the horizontal X or Y axes, and two universal (rotational) joints around one of the horizontal X or Y axes, and around the vertical Z axis. Its working space has the approximate shape of the lower hemisphere of a sphere or an inverted umbrella, and is completely contained by the supporting structure of the construction 3D printing system itself. The conventional nozzle through which the material is extruded moves with three degrees of freedom and only one fixed orientation. The articulated system of construction 3D printing consists primarily of a robot manipulator. The links of its kinematic chain are connected by six revolute (rotational) joints, each around one of the X, Y, or Z axes of the Cartesian coordinate system. Its working space has the approximate shape of an incomplete or complete sphere, which contains either partially or completely the construction 3D printing system itself. The conventional nozzle through which the material is extruded moves with three degrees of freedom and is oriented with three degrees of freedom.

In general, Cartesian and parallel construction 3D printing systems take up more space for installation and operation than cylindrical and articulated systems, mainly due to the need to install on site larger and more robust support systems and sometimes also additional guidance systems. Cylindrical and articulated construction 3D printing systems, although generally self-supporting, can only print around themselves, unless additional support and guidance systems are installed on site to allow them to move horizontally or vertically. However, cylindrical and articulated systems cannot print their surroundings completely without remaining enclosed within their own printed work. In any case, the need to install additional guidance systems on site for horizontal or vertical movement of a construction 3D printing system limits the possibilities of simultaneously operating a plurality of replicas of the system, or subsequently repositioning the same system at different locations on a construction site. The topology of the conventional nozzle path through which the mortar is extruded, in all classes of construction 3D printing systems presented herein, forms a simple helix that advances vertically, for depositing a continuous filament of the material.

Patent KR101914524 B1 dated 2 Nov. 2018, by Ghang Lee, entitled "3D mobile concrete building 3D printing system", discloses a mobile concrete building 3D printing system with less space limitation than conventional technology. The mobile concrete building 3D printing system according to the present invention can manufacture a wall by extruding concrete by a 3D printing method. A working position is recognized by means of a reference point, installed at a predetermined position, and the wall can be formed into various shapes.

Patent application DE10342934 A1 dated 28 Apr. 2005, by Helmut Kuch et al. entitled "Moldless, geometrically-fixed, prefabricated concrete part manufacturing method, e.g., for base sections of shafts in sewage systems, by discharging material from head to form finite volume elements, and hardening", describes that the body to be created is formed with a defined geometry by lining up finitely small volume elements in all three spatial directions. Immediately after being discharged from a tool head containing material nozzles, these volume elements are bonded to all immediately adjacent volume elements to form a fixed compound by chemical transformation, e.g., hardening. A 3D-CAD data file is used as the geometric data for the body.

Patent application WO2018136475 (A1) dated 26 Jul. 2018, by Yi-Lung Mo et al. entitled "4-dimensional printing of reinforced concrete" describes a 4-dimensional printing system and a method for printing reinforced concrete that may allow reinforced concrete elements to be printed free-form and/or fully automated without the need for formwork, molding, or labor. The printing system may include software and hardware systems. The software system may process 3D models of the reinforced concrete element desired into multiple layers. The software system may utilize the individual layer to control operation of the hardware system to print the desired reinforced concrete element layer-by-layer. The hardware system may provide a concrete nozzle, a reinforcement material nozzle, as well as dispensing mechanisms for printing the materials at the desired locations and/or at desired times for the individual layer being printed. The hardware system may also include motion control mechanisms that allow the position of the nozzles to be moved side-to-side, up and down, and towards or away relative to the element being printed as desired during the printing process.

Patent CN105715052 (B) dated 22 Jan. 2019, by Jianping Wu, entitled "3D room printer and printing method for printing concrete at construction site and room", describes a room, a 3D room printer, and a printing method. The 3D room printer is used for on-site printing at construction sites and comprises: a joist body, a drive mechanism, and a moving mechanism which are arranged in the joist body and are connected to each other; a concrete unload assembly, which is connected to the moving mechanism and is configured to unload concrete in the process of moving of the moving mechanism to complete the construction of the wall of the room; a lifting mechanism to increase the height of the 3D room printer, and an automatic control mechanism to automatically control the displacement of the concrete unload assembly. The 3D room printer can be used to print the room with reinforced concrete at the construction site, so the automation degree of room construction is high, the cost is low, and the working efficiency is high.

Patent application WO2018162858 (A1) dated 13 Sep. 2018, by Gael Godi et al., entitled "3D concrete printer", describes a mobile 3D printing device (TDPDO) that prints by adding material, intended to be attached to a lifting device (LD) with a single hoisting cable or chain, the mobile 3D printing device (TDPDO) comprising: —a printing head suitable for receiving the material and depositing it; —attachment means suitable for connecting the printing head to a lifting device (LD); and —stabilizing means (MS) suitable for stabilizing the position of the printing head by gyroscopic effect. Such a device makes it possible to control the printing of the structure to be printed, in particular the position of the printing head, and to reduce labor costs and the time required for installation on a lifting device (LD) such as a standard crane provided with a hook.

In the state of the art, there is no mention to a walking robotic cell for the manufacture of on-site printed buildings by means of a multi-axis 3D printing system, which can move by its own impulse, to position itself autonomously or to position it by remote operation, anywhere on a construction site, avoiding obstacles such as, for example, walls, beams, reinforcement bars, and vertical ducts above, under, or between them, and on uneven or soft ground by means of four locomotive legs, without the use of a crane or the installation of support or guidance systems on site, equipped with on-board power, control, and navigation systems, which can be connected zenithally to an external source of material and alternatively also to external power, control, and navigation systems, which is supported and transported by a quadruped mobile robotic system, and which contains a multi-axis actuator, which is reprogrammable, automatically controlled, and programmable offline or online in all its degrees of freedom from an external or remote computer, and which consists of a circular motion track with three or more carriages on which three or more robot manipulators mounted respectively on a telescopic columns in inverted position move, and on the flange of each robot manipulator an interchangeable nozzle is mounted, which has an electronically controlled shut-off valve, and which is connected to a flexible hose for conveying of materials, which is part of a feeding device through which the mortar that is pumped from the outside of the walking robotic cell descends, to be extruded into filaments that are deposited in successive superimposed layers, according to a previous computational path design that reproduces the inner and outer contour of the building in all its horizontal and vertical extension; and a method of operation that allows to generate multiple helical paths of simultaneous deposition of continuous filaments of a mortar to reduce the time elapsed between the deposition of each successive layer, enabling various tasks to be performed simultaneously, such as printing contours and inner contours of structuring patterns, or solid fills; and that allows to orient interchangeable nozzles with three rotational degrees of freedom, which may have different shapes, symmetrical or asymmetrical, to expedite the extrusion of various types of mortars and to optimize the coverage of each filament, especially between the preinstalled reinforcement bars and vertical ducts.

SUMMARY OF THE INVENTION

A first objective of the invention is to provide a walking robotic cell for the manufacture of on-site printed buildings by means of a multi-axis 3D printing system, comprising a quadruped mobile robotic system, acting autonomously and remotely operated, consists of four locomotive legs with five degrees of freedom each, to achieve a stable gait algorithm and carrying a toroidal frame which inside houses on-board power, control, and navigation systems, which supports three radial beams on its upper outer face, equidistant from each other and concurrent in a hollow shaft zenithal node through which hoses and cables pass, and which supports a circular motion track on its lower outer face, which is part of a multi-axis actuator, and a feeding device consisting of an external semi-rigid hose for conveying of material, which is connected by a hose coupling to a flange of an extension tube that runs vertically through a hollow shaft rotary connector and connects to a multi-outlet rotary distributor, where three or more flexible hoses for conveying of material are connected to three or more discharge outlets respectively, which at their other end are connected to three or more interchangeable nozzles having electronically controlled shut-off valves, wherein the hollow shaft rotary connector diverts a plurality of cables and hoses for power supply, control, and others, from each carriage of the circular motion track to the hollow shaft zenithal node, and the flange of an extension tube is secured to a clamping ring, to which an inner drum of the hollow shaft rotary connector is secured and which is fixed to the hollow shaft zenithal node to prevent the outer semi-rigid hose for conveying of material from kinking, while rotating cable trays corresponding with each carriage of the circular motion track are secured to an outer drum of the hollow shaft rotary connector to prevent the plurality of power cables and hoses from kinking, and wherein the multi-outlet rotary distributor prevents the three or more flexible hoses for conveying of material from kinking, while three or more robot manipulators that position and orient the three or more interchangeable nozzles move in circular motion and adopt various poses for 3D printing with the mortar; and a multi-axis actuator, which is a reprogrammable electromechanical system, automatically controlled, programmable offline or online in all its degrees of freedom from an external or remote computer, which consists of a circular motion track, with three or more carriages on which three or more robot manipulators mounted on three or more telescopic columns in inverted position move, and on the flange of each robot manipulator the interchangeable nozzle is mounted, which has an electronically controlled shut-off valve and which is connected to the flexible hose for conveying of material.

A second object of the invention is to provide a method for operating a walking robotic cell, for the manufacture of on-site printed buildings by using a multi-axis 3D printing system, comprising the steps of: a) commanding the quadruped mobile robotic system of the walking robotic cell to autonomously position and level itself, or to position and level it by means of remote operation, at an intended location on a construction site, with its feeding device suitably connected to an external source of material such as, for example, a mortar pump and alternatively to power, control, and navigation systems such as, for example, an electricity generator or an installed electrical network, an external compressor and controller, to actuate its multi-axis actuator by means of a program executed from an external or remote computer, and to initiate the on-site 3D printing of a building, whose building components may have preinstalled reinforcement and vertical ducts inside; b) actuating the three or more robot manipulators to position and orient the three or more interchangeable nozzles, preferably at distal points of the inner and outer contour of the building or a portion thereof to be printed, and start with each one, in the same direction of movement, the deposition of continuous filaments of a mortar in successive superimposed layers, according to a previous computational path design, which reproduces the inner and outer contour of the building in all its horizontal and vertical extension and whose combined advancement can describe the topology of a multiple ascending helix that, for example, may reduce the time elapsed between the deposition of each successive layer and thus avoid that a rapid initial setting prevent consecutive layers of mortar from adhering properly to each other, and wherein the three or more interchangeable nozzles repeat the same path in each successive layer or, alternatively, each interchangeable nozzle reproduces a different path and performs a different task, notwithstanding that, due to the design of the building itself, the position and orientation of each interchangeable nozzle may vary slightly in the next layer; and c) executing the program of the multi-axis actuator from an external or remote computer, so that each carriage of the circular motion track and each telescopic column mounted on each carriage independently positions each robot manipulator at the required horizontal and vertical distance at each required instant, and that each robot manipulator independently positions and orients the interchangeable nozzle mounted on its flange at each required instant, according to a previous computational path design that reproduces the inner and outer contour of the building in all its horizontal and vertical extension.

DESCRIPTION OF A PREFERRED EMBODIMENT

Figure 1:
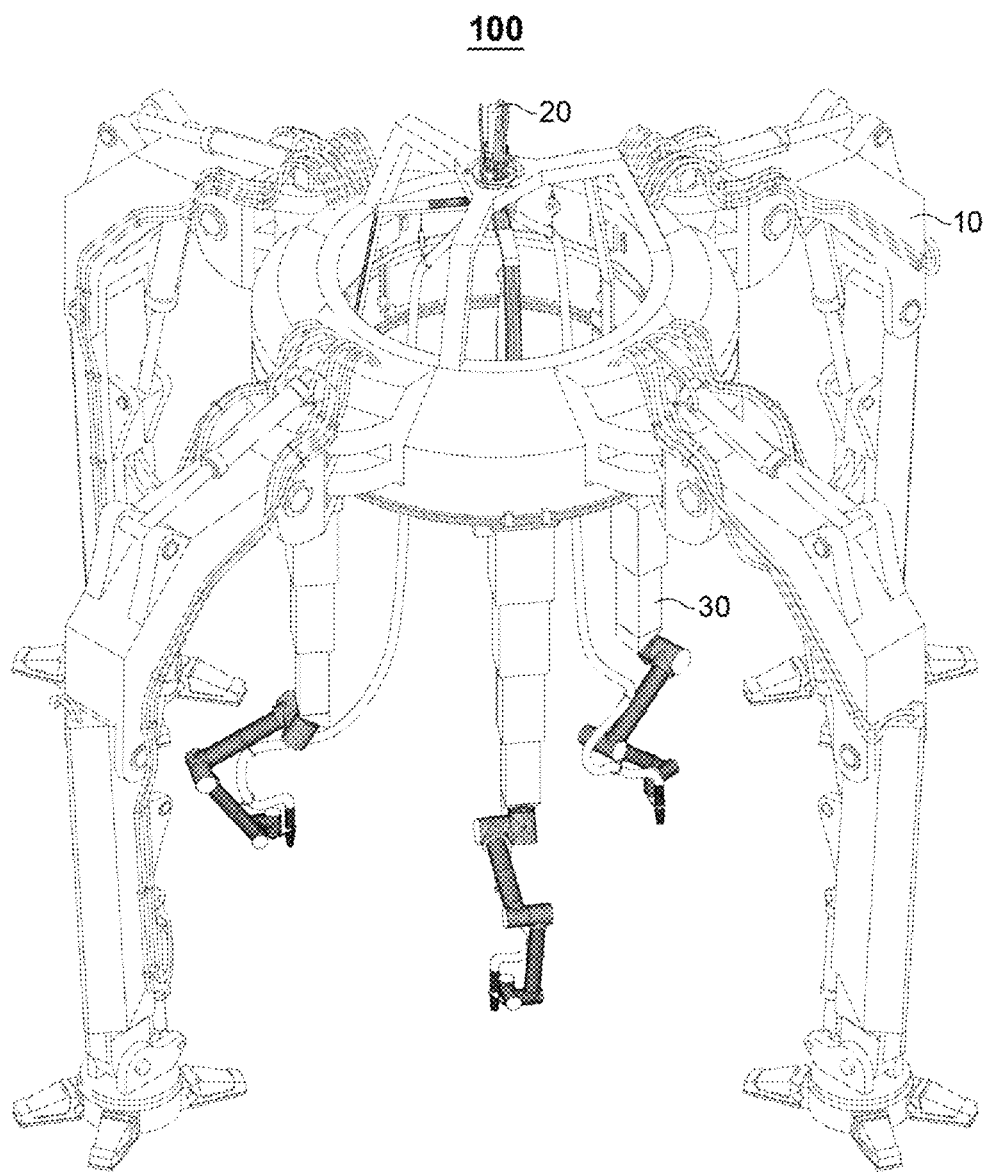
FIG. 1 depicts a top isometric view of the walking robotic cell for construction 3D printing of the invention, in an example for operating with three robot manipulators.

The first object of the invention is to provide a walking robotic cell for the manufacture of on-site printed buildings by means of a reprogrammable multi-axis 3D printing system, automatically controlled, and programmable in all its degrees of freedom from an external or remote computer. The walking robotic cell itself is capable of autonomously moving, or being moved by remote operation, by ground transportation to a construction site and to position itself at the required location, including the next upper or lower level of a building under construction, to proceed with 3D printing. The walking robotic cell can support its locomotive legs on slabs, preferably prefabricated, and on conventional, motorized, or climbing scaffolds, it levels itself by actuating the same and feeds centrally with material from a mortar pump, by means of an external semi-rigid hose for conveying of material. Since the on-board power, control, and navigation systems have limited energy autonomy over time, the walking robotic cell can also be fed zenithally with electrical power from a generator or an installed electrical network, with hydraulic or pneumatic power from an external compressor, and with control and navigation signals from an external controller, without the need to obstruct other work around it at ground level.

A walking robotic cell is the main physical component for the manufacture of on-site printed buildings using a proposed multi-axis 3D printing system. The walking robotic cell itself is a self-contained, scalable, and replicable functional unit, which can be applied in an isolation manner or simultaneously to print buildings on-site, whose building components may have preinstalled reinforcement and vertical ducts inside, and consists of a quadruped mobile robotic system, a feeding device, and a multi-axis actuator.

The quadruped mobile robotic system itself is a locomotion device with autonomous and remotely operated control, which constitutes the support and transport of the feeding device, the multi-axis actuator, and the piping that protects power and control cables and hoses, and consists of a toroidal frame that in the thickness of its interior houses on-board power, control, and navigation systems, it supports on its upper outer face three radial beams, equidistant from each other and concurrent in a hollow shaft zenithal node through which hoses and cables pass, it supports on its lower outer face a circular motion track, which is part of the multi-axis actuator, and on its perimeter outer face it has four locomotive legs having four revolute joints, one prismatic joint, and three hydraulic or pneumatic reinforcements on each leg, to achieve a stable gait algorithm. The frame, the four locomotive legs, the concurrent beams, and the hollow shaft zenithal node, are of a size and robustness to be defined according to specifications to adequately withstand the forces to which the quadruped mobile robotic system will be subjected in its commissioning, both during its movement and during the 3D printing process. The operational purpose of the hollow shaft zenithal node is to let in and out of the walking robotic cell a semi-rigid external hose for conveying of material and a plurality of cables and hoses for power supply, control, and others, which connect to external devices to replace, if necessary, on-board power, control, and navigation systems. The quadruped mobile robotic system is capable of varying the height and orientation of the walking robotic cell, enabling it to move from one enclosure of a building under construction to another, avoiding obstacles such as, for example, walls, beams, reinforcement bars, and vertical ducts above, below, or between them.

The feeding device itself is a material conveying, cable and hose branching and untwisting device, consisting of an external semi-rigid hose for conveying of material, which is connected by means of a hose coupling to a flange of an extension tube, which runs vertically through a hollow shaft rotary connector (such as, for example, the H-Through Hole Slip Ring, or the SENRING™ Gas & Flow Passage Hollow Shaft Rotary Union) and is connected to a multi-outlet rotary distributor, where three or more flexible hoses for conveying of material are connected to three or more discharge outlets, which lead the mortar to three or more interchangeable nozzles with electronically controlled shut-off valves, mounted respectively on the flange of three or more robot manipulators that repeat a previous computational path design that reproduces the inner and outer contour of the building or a portion thereof. The flange of an extension tube to which the semi-rigid external hose for conveying of material is attached is secured to a clamping ring which is attached to the hollow shaft zenithal node, and the top edge of an inner drum of the hollow shaft rotary connector is secured to the same clamping ring, preventing the semi-rigid outer hose for conveying of material from kinking, and allowing an outer drum of the hollow shaft rotary connector to rotate in solidarity with rotating cable trays, which protect a plurality of cables and hoses for power supply, control, and others, which feed and communicate to three or more robot manipulators moving on a circular motion track in an inverted position. Each rotating cable tray rotates in solidarity with each carriage on which a robot manipulator moves, and from the lower face of each rotating cable tray hangs a retractable rocker arm that helps to partially support the weight of each flexible hose for conveying of material as it moves through the three-dimensional space loaded with mortar.

The multi-axis actuator itself is a reprogrammable electromechanical system, automatically controlled, programmable offline or online in all its degrees of freedom from an external or remote computer and consists of a circular motion track (such as, for example, the HEPCOMOTION™ Automotive Robot Track System), with three or more carriages on which move, with one degree of freedom, three or more robot manipulators of six degrees of freedom respectively, each mounted on a telescopic column in inverted position, which extends and retracts, with one degree of freedom respectively. The circular motion track itself comprises three or more carriages driven by motorized pinion and rack, and a slide guidance system and concentric guides. Said circular motion track is supported on the lower outer face of the toroidal frame of the quadruped mobile robotic system of the walking robotic cell. Each telescopic column can be electrically, hydraulically, or pneumatically actuated and extends and retracts independently and in a controlled manner, to move each of the three or more robot manipulators in a vertical direction, as the printing layer by layer advances in height, but also to avoid colliding with a wall, beam, reinforcement bar, or duct, while the walking robotic cell passes above, below, or in between them.

DETAILED DESCRIPTION OF A PREFERRED EMBODIMENT

Figure 2:
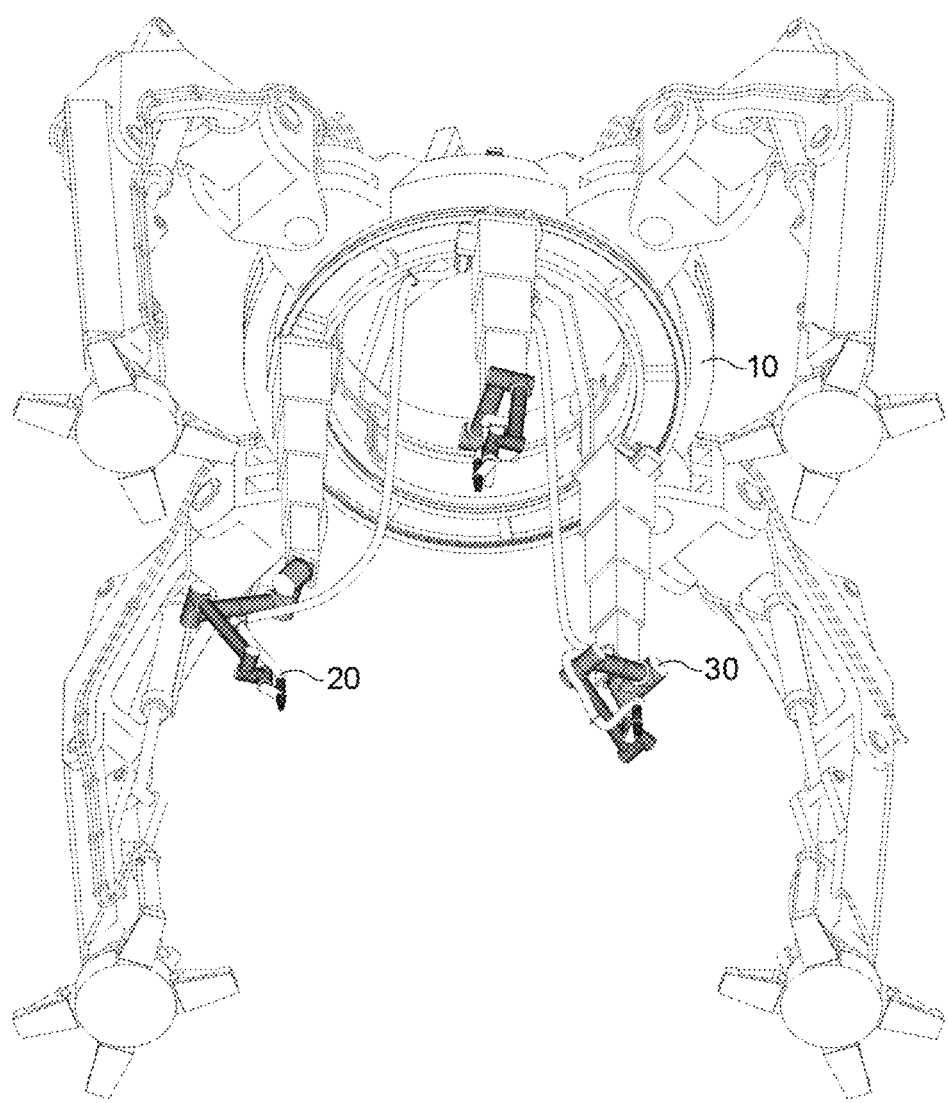
FIG. 2 depicts a lower isometric view of the walking robotic cell for construction 3D printing of the invention, in an example for operating with three robot manipulators.
Figure 3:
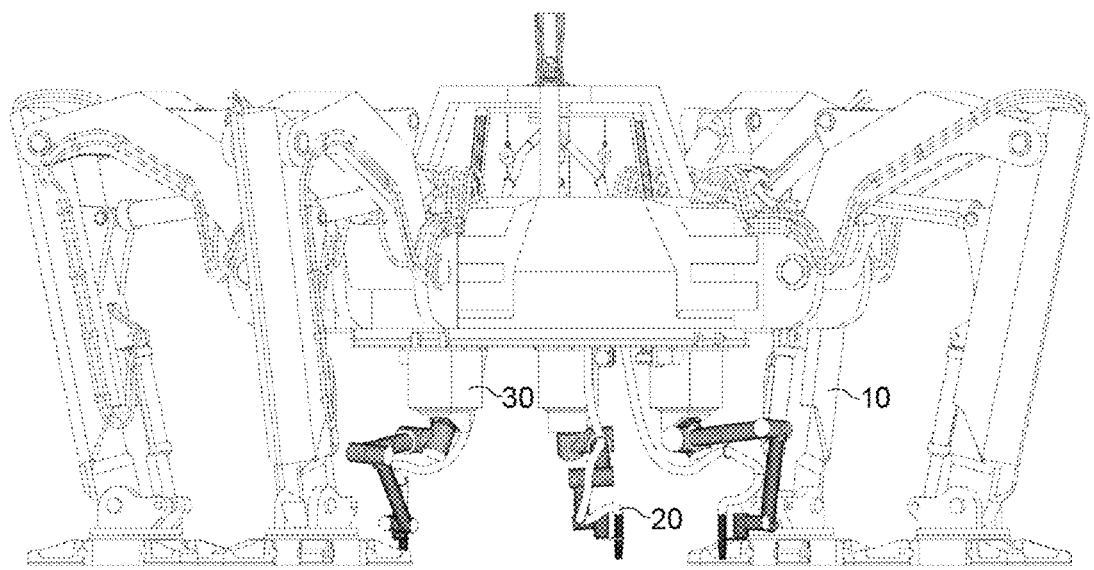
FIG. 3 depicts an oblique view of the walking robotic cell for construction 3D printing of the invention, at its minimum height, in an example for operating with three robot manipulators.
Figure 4:
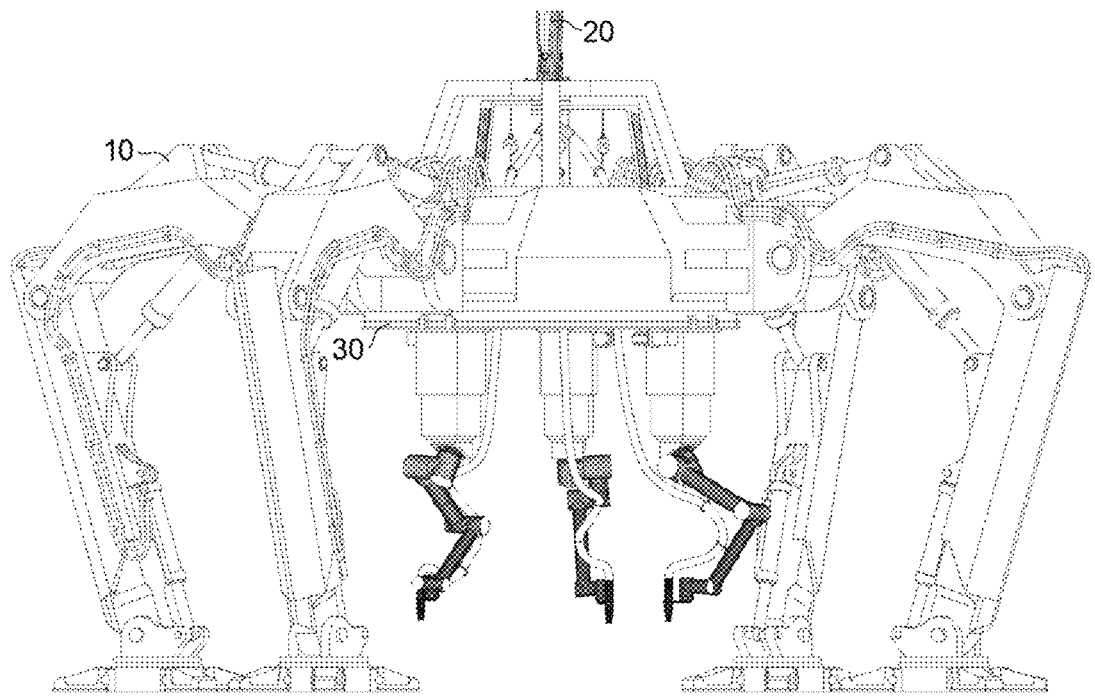
FIG. 4 depicts an oblique view of the walking robotic cell for construction 3D printing of the invention, at an intermediate height, in an example for operating with three robot manipulators.
Figure 5:
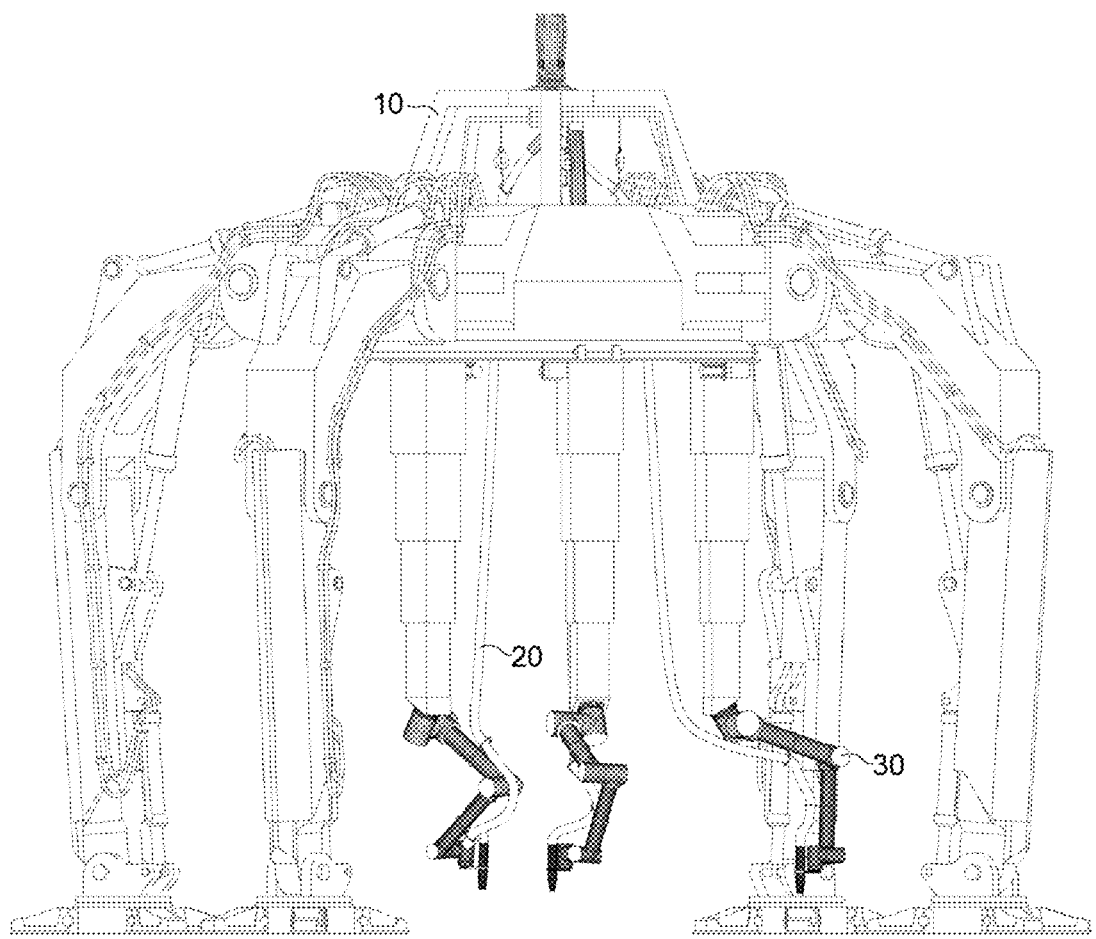
FIG. 5 depicts an oblique view of the walking robotic cell for construction 3D printing of the invention, at an intermediate height and its telescopic columns extended to the maximum, in an example for operating with three robot manipulators.
Figure 6:
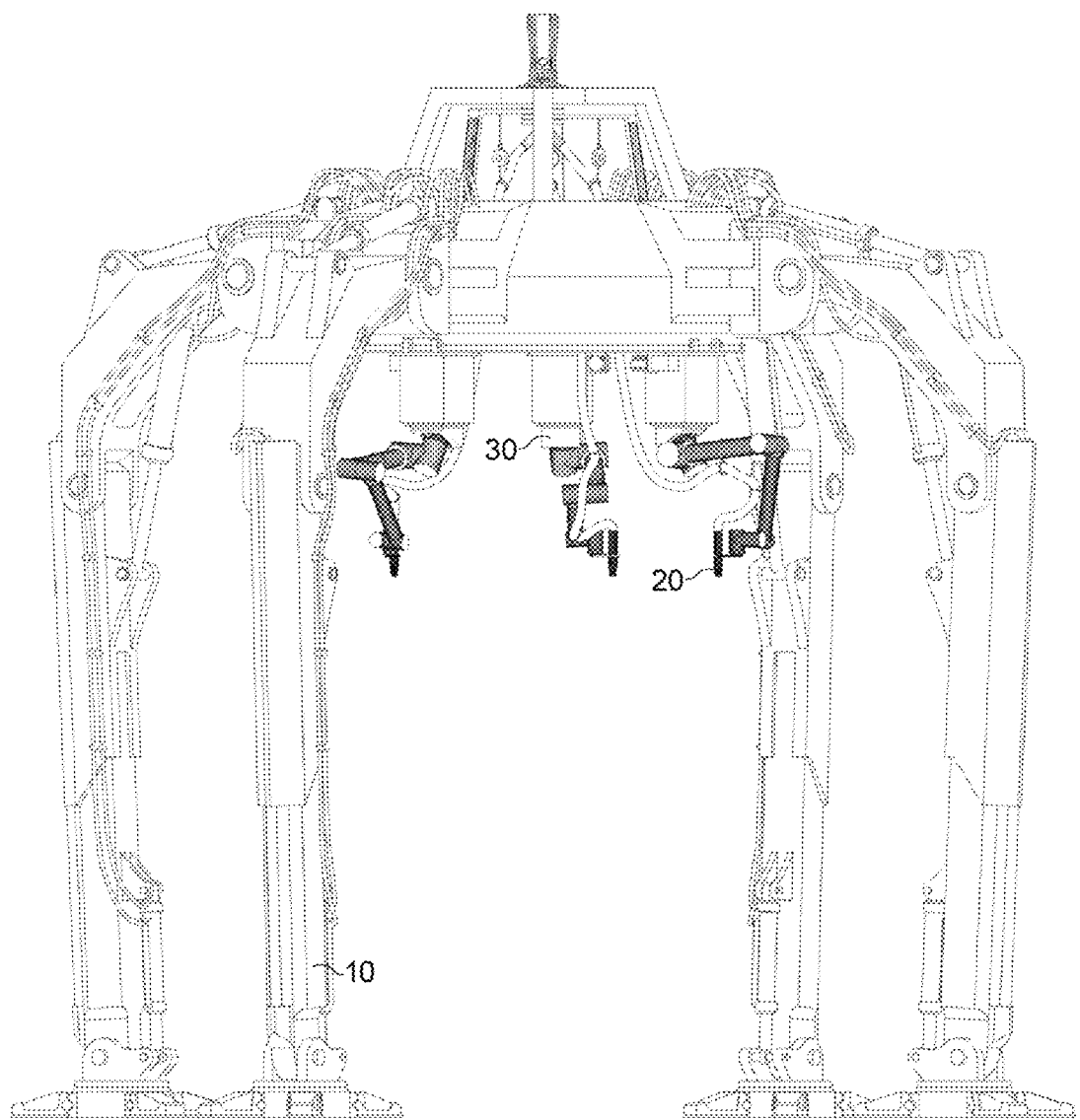
FIG. 6 depicts an oblique view of the walking robotic cell for construction 3D printing of the invention, at its maximum height, in an example for operating with three robot manipulators.
Figure 7:
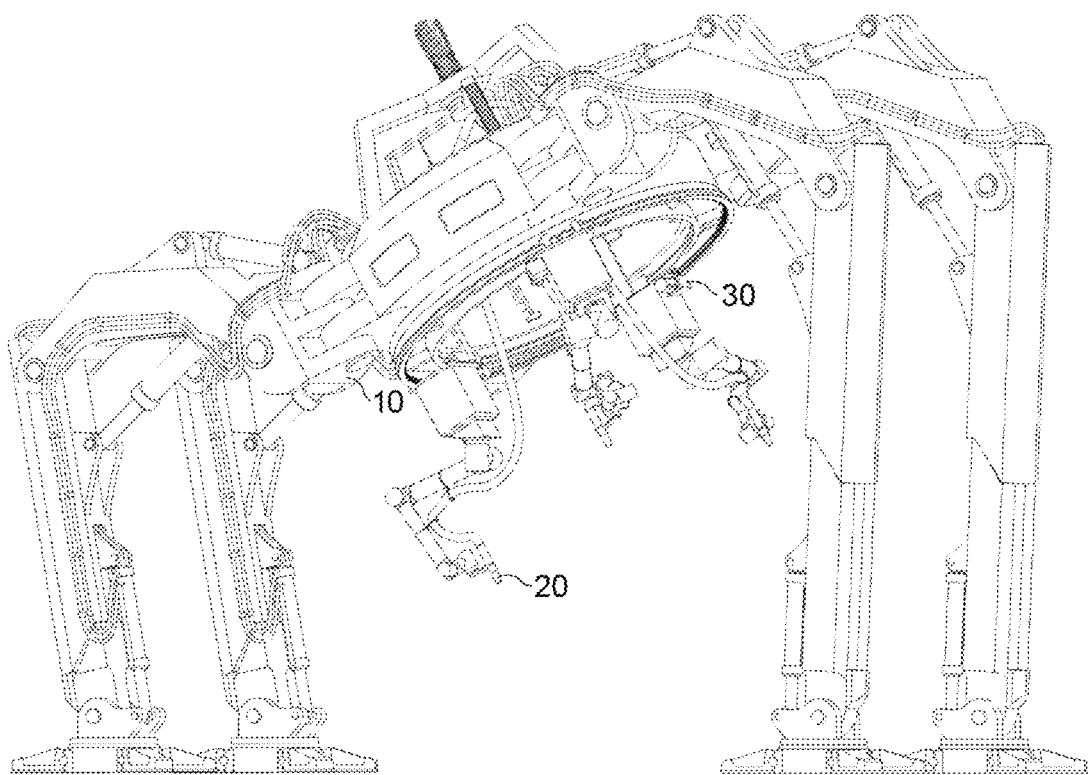
FIG. 7 depicts an oblique view of the walking robotic cell for construction 3D printing of the invention, balancing, in an example for operating with three robot manipulators.

The walking robotic cell (100) for the manufacture of on-site printed buildings using a multi-axis 3D printing system, depicted in FIGS. 1 and 2 and in various stages of configuration in FIGS. 3 to 8, comprises a quadruped mobile robotic system (10), a feeding device (20), and a multi-axis actuator (30), which is a reprogrammable, automatically controlled electromechanical system, programmable offline or online in all its degrees of freedom from an external or remote computer.

Figure 9:
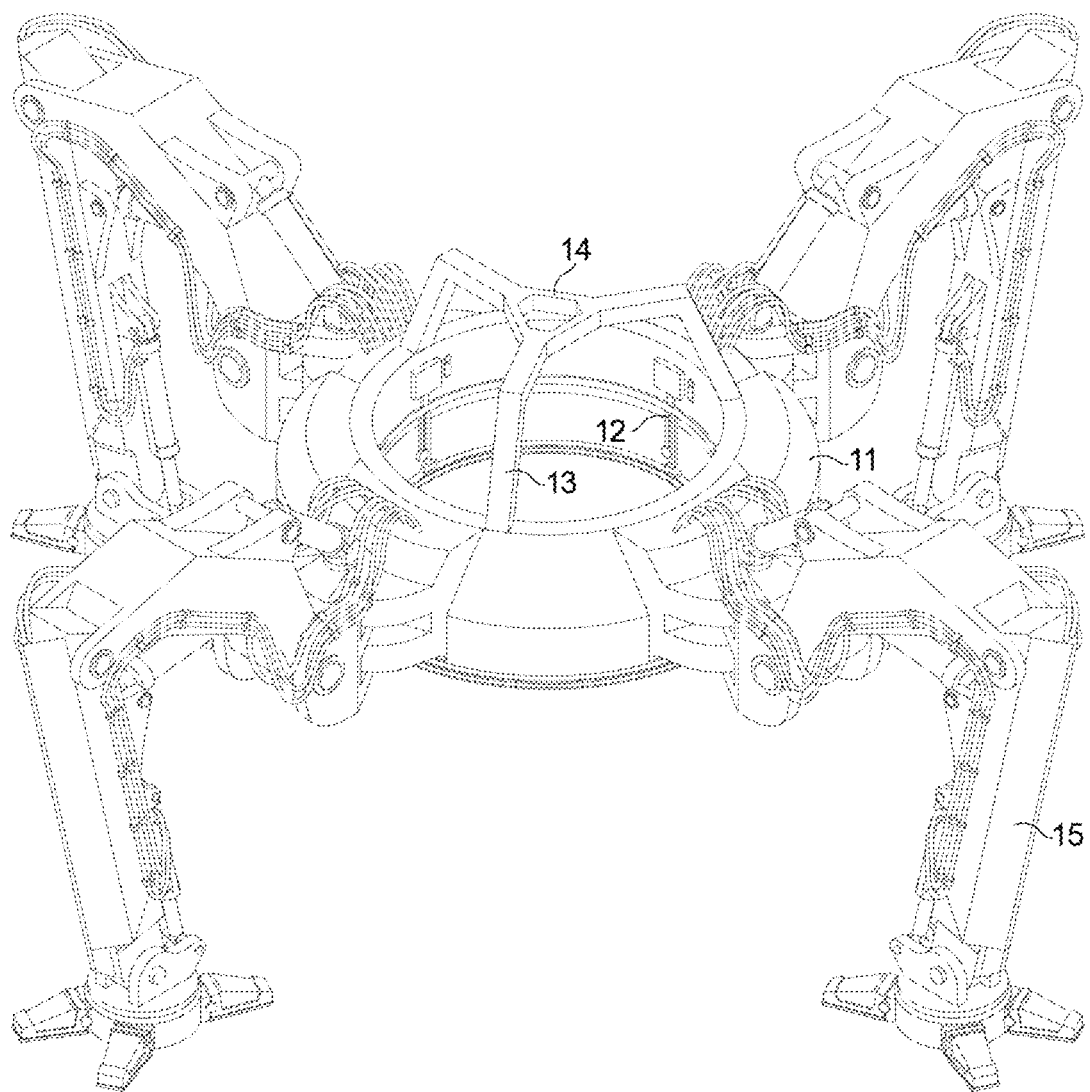
FIG. 9 depicts an isometric view of the quadruped mobile robotic system of the walking robotic cell for construction 3D printing of the invention, in an example for operating with three robot manipulators.

The quadruped mobile robotic system (10) depicted in FIG. 9, consists of a toroidal frame (11) that in the thickness of its interior houses on-board power, control, and navigation systems that are not shown, on its inner face it supports piping (12), on its upper face supports three radial beams (13), equidistant from each other and concurrent in a hollow shaft zenithal node (14), on its lower face it supports a circular motion track (31), which is part of the multi-axis actuator (30), and on its perimeter face it has four locomotive legs (15) with four revolute joints, one prismatic joint, and three hydraulic or pneumatic reinforcements on each leg, to achieve a stable gait algorithm.

Figure 10:
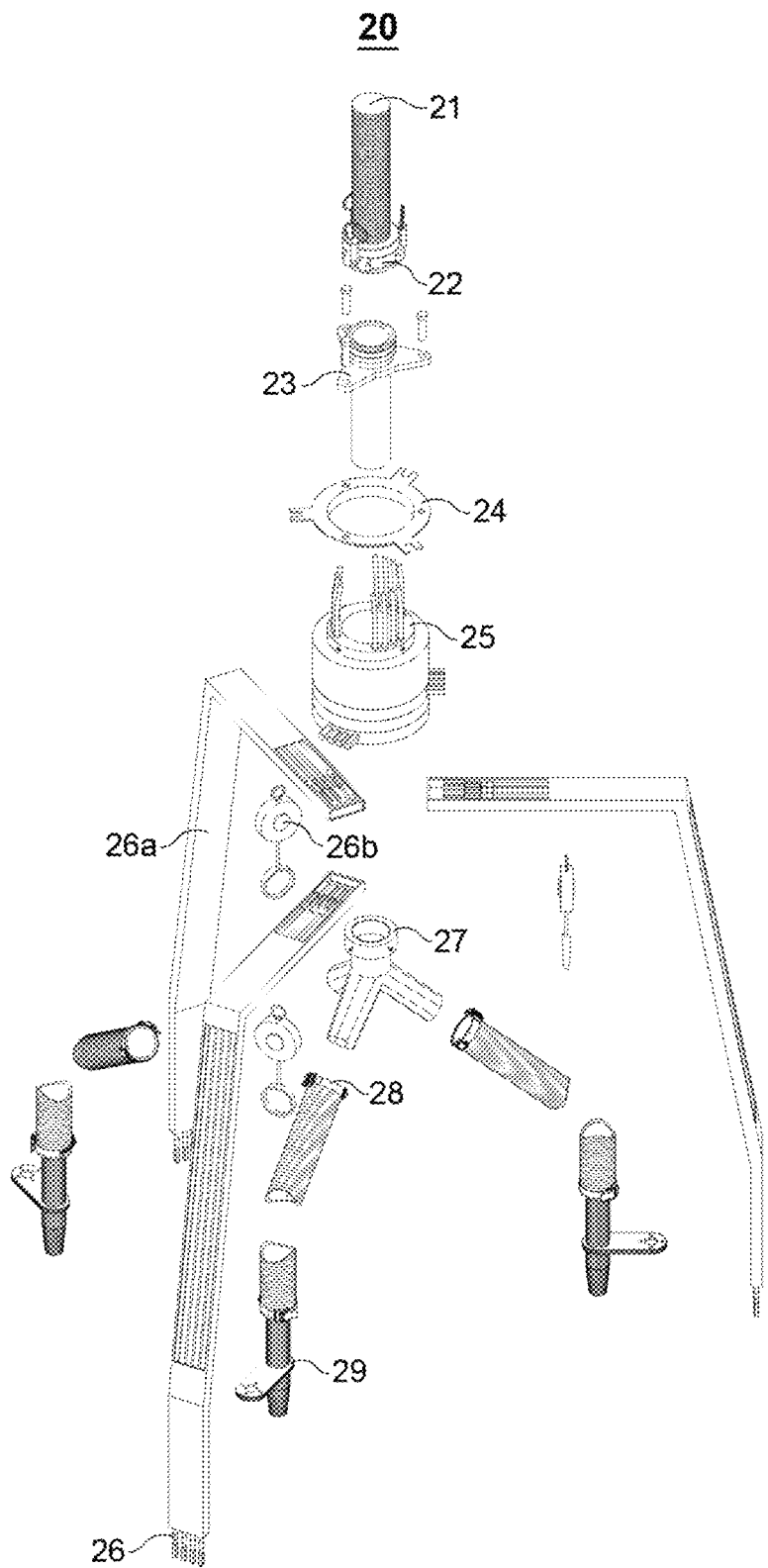
FIG. 10 depicts an exploded isometric view of the feeding device of the walking robotic cell for construction 3D printing of the invention, in an example for operating with three robot manipulators.

The feeding device (20), depicted in FIG. 10, consists of an external semi-rigid hose for conveying of material (21), which may come from a mortar pump, which is connected by a hose coupling (22) to a flange of an extension tube (23), which is secured to a clamping ring (24), which is fixed to the hollow shaft zenithal node (14), and an inner drum of a hollow shaft rotary connector (25) is secured to said clamping ring (24), which is a rotating device used for transferring electrical, hydraulic, or pneumatic power, analog or digital control circuits or data, and also media such as vacuum, cooling fluids, steam, and others, from one or multiple fixed inputs—in this case arranged on the inner drum—to one or multiple rotating outputs—in this case arranged on an outer drum—and diverting a plurality of cables and hoses for power supply, control, and others (26), which feed and communicate three or more carriages (31a) of a circular motion track (31), with three or more telescopic columns (31f) and three or more robot manipulators (31g), which are depicted in FIG. 10, towards an electricity generator or an installed electrical network, an external compressor and controller, which are not shown. Three or more rotating cable trays (26a), rotate in solidarity with the outer drum of the hollow shaft rotary connector (25) and with each carriage (31a) to prevent the plurality of cables and hoses for power supply, control, and others (26) from kinking or tangling, and retractable rocker arms (26b) hang from their lower faces, which help to partially support the weight of each of the flexible hoses for conveying of material (28) as they move through the three-dimensional space loaded with mortar, as shown in FIGS. 1 to 6. The flange of an extension tube (23) runs vertically through the hollow shaft rotary connector (25) and connects at its lower end to a multi-outlet rotary distributor (27), where three or more flexible hoses for conveying of material (28) are connected to three or more discharge outlets, which convey the mortar to three or more interchangeable nozzles (29) with electronically controlled shut-off valves that are not shown, mounted on the flange of three or more robot manipulators (31g).

Figure 8:
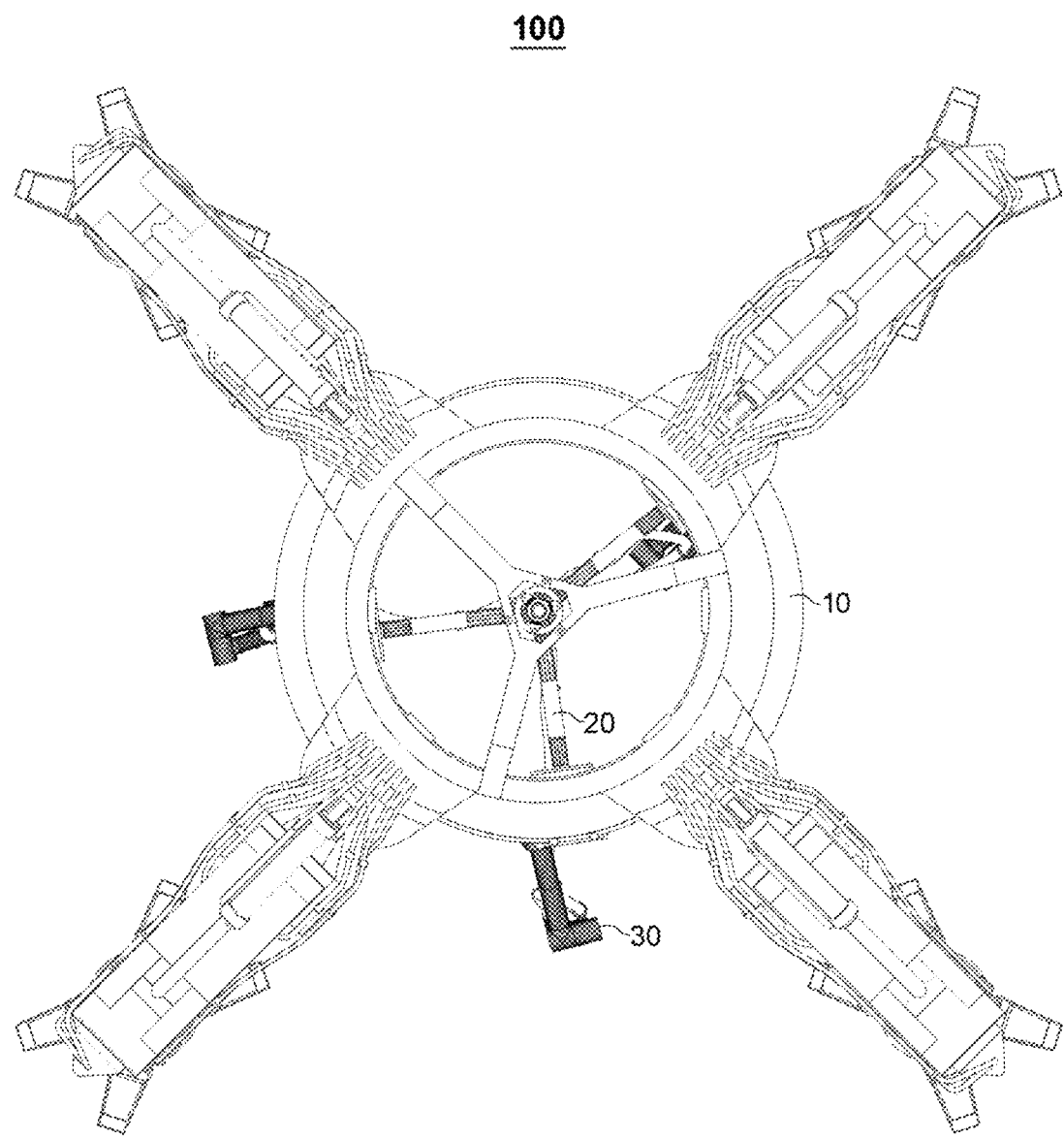
FIG. 8 depicts a plan view of the walking robotic cell for construction 3D printing of the invention, in an example for operating with three robot manipulators.
Figure 11:
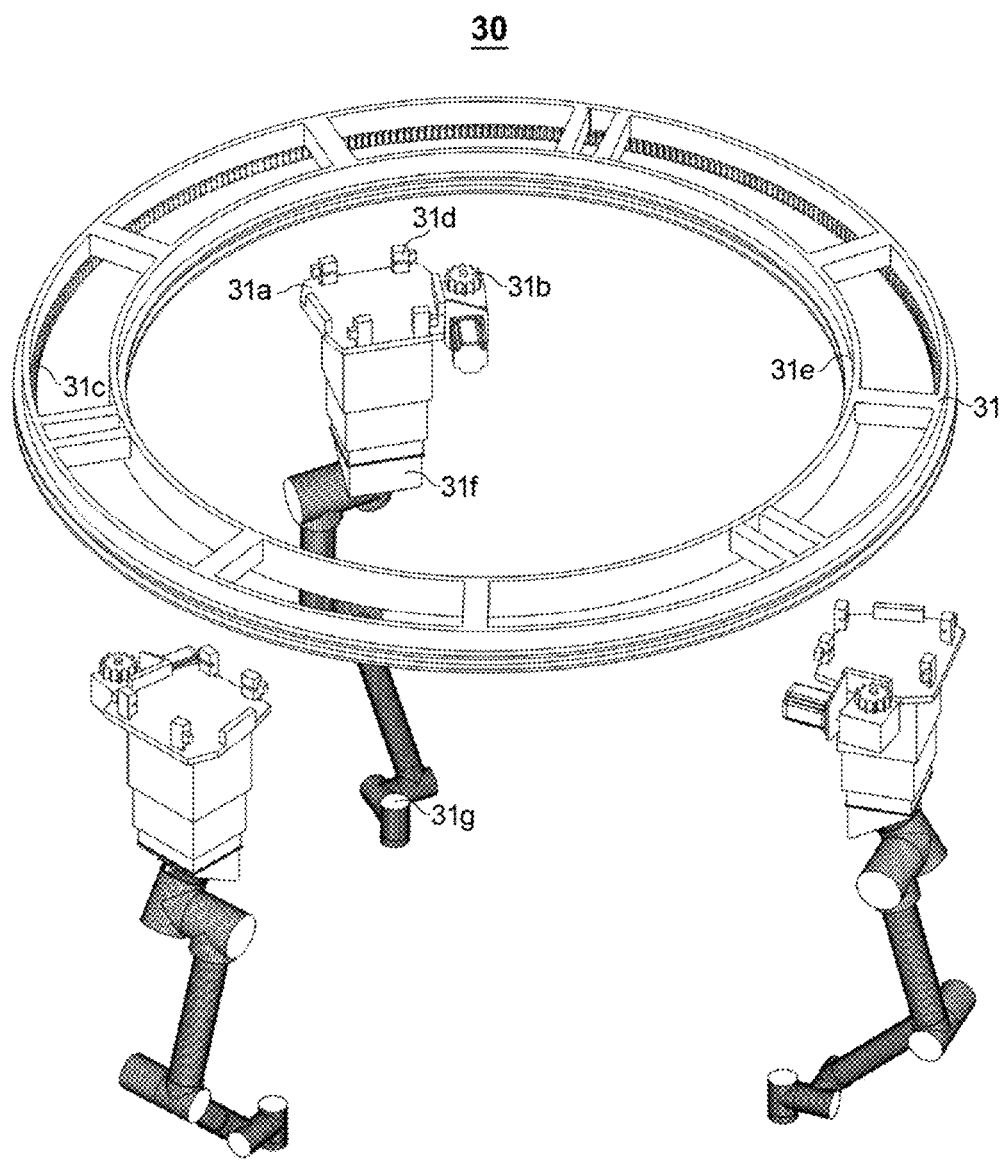
FIG. 11 depicts an exploded isometric view of the multi-axis actuator of the walking robotic cell for construction 3D printing of the invention, in an example for operating with three robot manipulators.

The multi-axis actuator (30), depicted in FIGS. 3 to 7 and in a plan view in FIG. 8, which is a reprogrammable electromechanical system, automatically controlled, programmable offline or online in all its degrees of freedom from an external or remote computer, depicted in detail in FIG. 11, comprises a circular motion track (31) which is held in the lower face of the toroidal frame (11) of the quadruped mobile robotic system (10). The circular motion track (31) consists of three or more carriages (31a), which are respectively actuated by a motorized pinion (31b) and a rack (31c), and respectively guided by four bearing assemblies (31d) on two concentric guides (31e), and on each carriage (31a) a telescopic column (31f) is mounted, and on it a robot manipulator (31g) in inverted position, with all its cables and hoses for power supply, control, and others (26) protected by three or more rotating cable trays (26a), which are depicted in FIG. 10.

Figure 12:
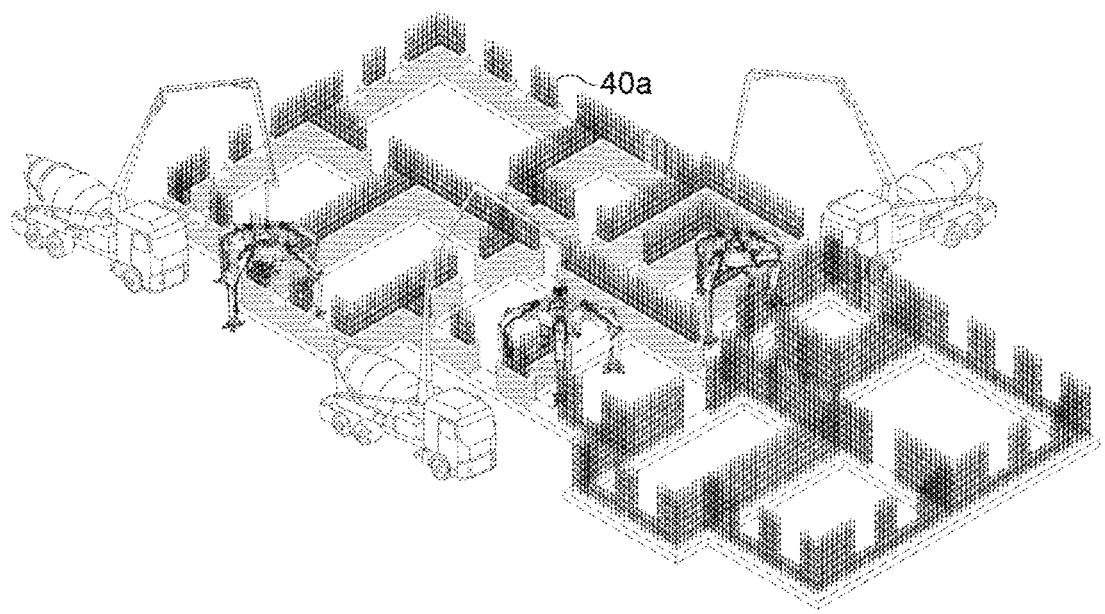
FIG. 12 depicts a first example of operation of the walking robotic cell, in an initial manufacture stage of a first floor of an on-site printed building with reinforcement anchored to the foundation, vertical ducts preinstalled inside some walls and sills installed or completed during the 3D printing process.
Figure 13:
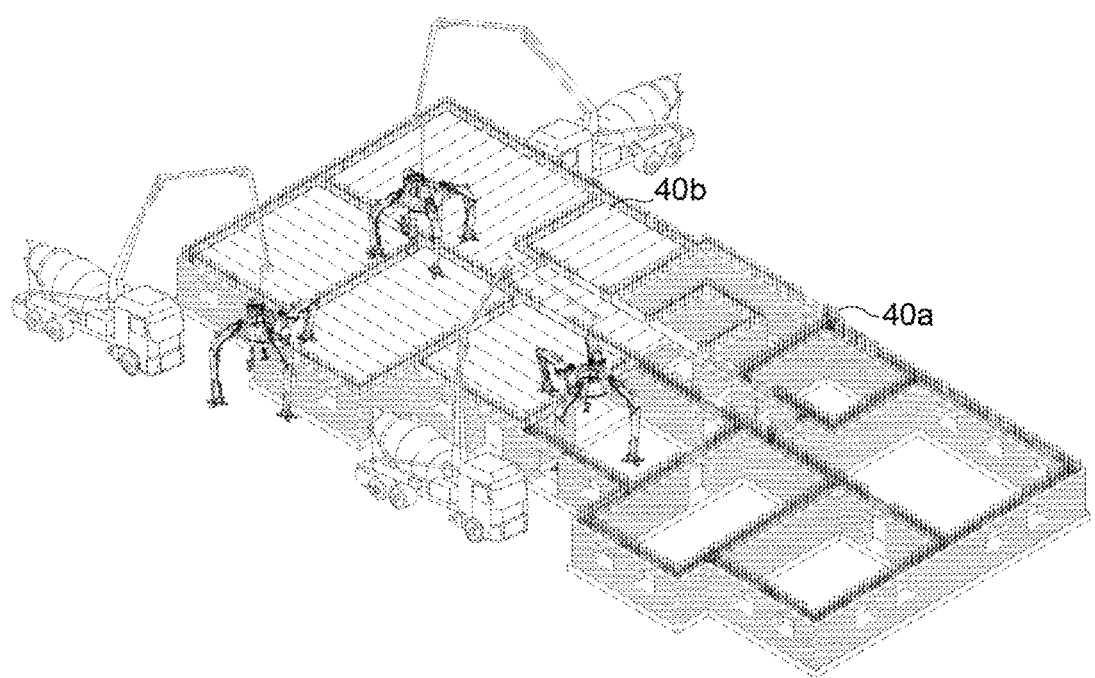
FIG. 13 depicts a second example of operation of the walking robotic cell, in the initial manufacture stage of a second floor of an on-site printed building, as it climbs onto a preferably prefabricated slab and moves over and between preinstalled reinforcements, lap splices, and vertical ducts.
Figure 14:
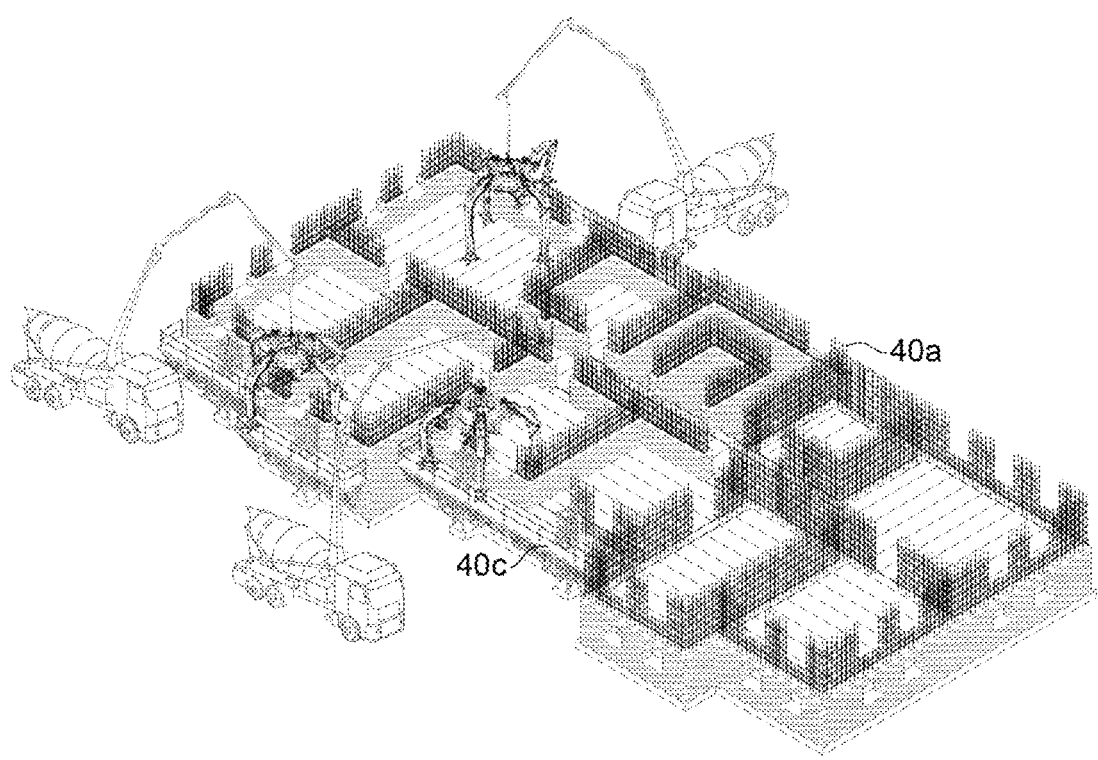
FIG. 14 describes a third example of operation of the walking robotic cell supported on a conventional, motorized, or climbing scaffold, and a preferably prefabricated slab, to print the inner and outer contour of the perimeter walls of a second floor of an on-site printed building with preinstalled reinforcement and vertical ducts.
Figure 15:
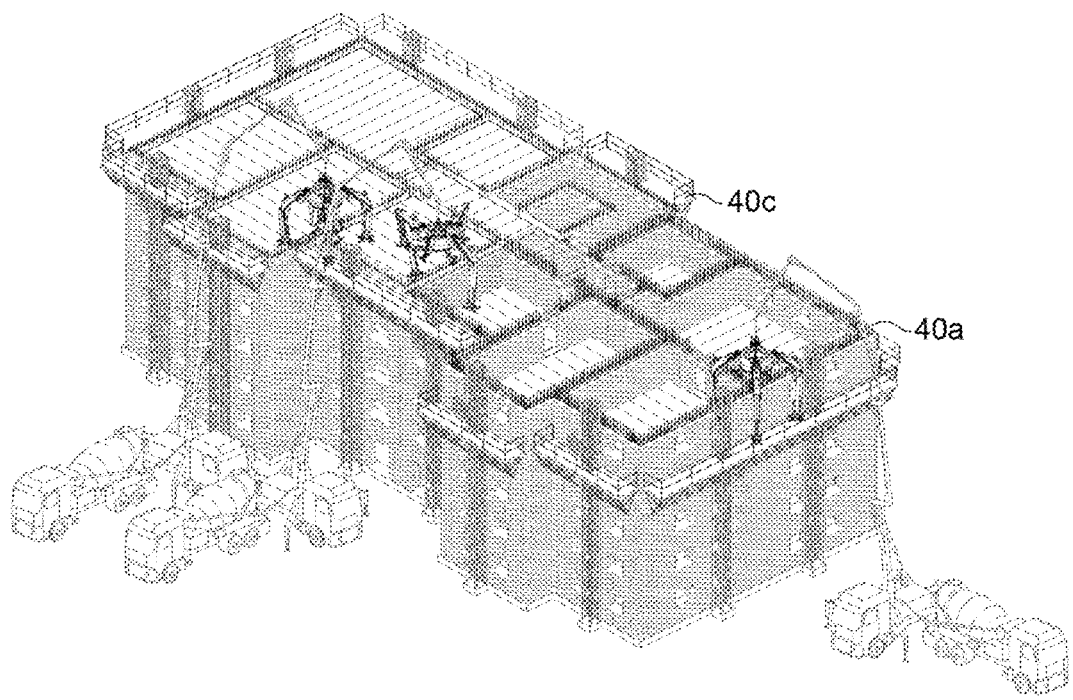
FIG. 15 describes a fourth example of operation of the walking robotic cell supported on a conventional, motorized, or climbing scaffold, and a preferably prefabricated slab, to print the inner and outer contour of the perimeter walls of a fifth floor of an on-site printed building with preinstalled reinforcement and vertical ducts.

The building (40) printed on-site by generating multiple helical paths of simultaneous deposition of continuous filaments of a cement mortar, is depicted in FIGS. 12 to 15; FIG. 12 illustrates a first example of an initial manufacturing stage of a first floor with reinforcement bars (40a) anchored to the foundation, vertical ducts preinstalled inside some walls, and sills installed or completed during the 3D printing process; FIG. 13 shows a second example of a preferably prefabricated slab (40b) of a second floor, to which the walking robotic cell (100) climbs, while moving over and between preinstalled reinforcement bars (40a), lap splices, and vertical ducts; FIG. 14a shows a third example of a conventional, motorized, or climbing scaffold (40c), on which the walking robotic cell (100) supports one of its four locomotive legs (15) to print the inner and outer contour of the perimeter walls of a second floor with preinstalled reinforcement bars (40a) and vertical ducts; and FIG. 15a shows a fourth example of a conventional, motorized, or climbing scaffold (40c) on which the walking robotic cell (100) is partially supported to print the inner and outer contour of the perimeter walls of a fifth floor with preinstalled reinforcement bars (40a) and vertical ducts.

Description of the Operating Method of the System

A second object of the invention is to provide an operating method of the walking robotic cell (100), which requires the following steps:

a) commanding the quadruped mobile robotic system (10) of the walking robotic cell (100) to autonomously position and level itself, or to position and level it by remote operation, at an intended location on a construction site to perform on-site 3D printing of a building or a portion thereof;

b) connecting the feeding device (20) of the walking robotic cell (100) to an external source of material such as, for example, a mortar pump, not shown;

c) alternatively, connecting the feeding device (20) of the walking robotic cell (100) to external power, control, and navigation systems such as, for example, an electricity generator or an installed electrical network, an external compressor and controller, not shown;

d) actuating the multi-axis actuator (30) of the walking robot cell (100), such that each carriage (31a) of the circular motion track (31) moves a robot manipulator (31g) to a point preferably distal to the inner and outer contour of the building, or a portion thereof, ready to be printed, and extending or retracting each telescopic column (31f) to a suitable height from which each robot manipulator (31g) can properly position and orient each interchangeable nozzle (29) mounted on its flange and proceed with the deposition of continuous filaments of a mortar;

e) starting the pumping of the mortar that enters through the external semi-rigid hose for conveying of material (21) and that descends through the flange of an extension tube (23), the multi-outlet rotary distributor (27), and each flexible hose for conveying of material (28), until it is extruded through each interchangeable nozzle (29) mounted on the flange of each robot manipulator (31g), f) executing the program of the multi-axis actuator (30) from an external or remote computer, not shown, to initiate the deposition of continuous filaments of a mortar in successive superimposed layers, according to a previous computational path design that reproduces the inner and outer contour of the building, or a portion thereof, in all its horizontal and vertical extension;

g) stopping the 3D printing process once the desired height for the contour to be manufactured has been reached, or the maximum height from which the three or more robot manipulators (31g) can adequately print in the current situation has been reached;

h) disconnecting, only if necessary, the feeding device (20) of the walking robotic cell (100) from external power, control, and navigation systems such as, for example, an electricity generator or installed electrical network, an external compressor and controller, or also from the mortar pump, which are not shown; and i) repeating the procedure from step a). Otherwise, commanding the quadruped mobile robotic system (10) of the walking robotic cell (100) to autonomously remove itself from the construction site, or to remove it by remote operation.

Examples of Applications

In a first example of application in an armed conflict zone, to reconstruct by 3D printing a building (40) with reinforcement bars (40a) anchored to a foundation (40b) and not exceeding the maximum height from which the robot manipulators (31g) can print, the walking robotic cell (100) is commanded to autonomously position and level itself, or by remote operation, at an intended location, with its feeding device (20) duly connected to a mortar pump, which is not shown, and its multi-axis actuator actuated by a program executed from an external or remote computer (30) performs the deposition of continuous filaments of a mortar in successive superimposed layers, according to a previous computational path design, which reproduces the inner and outer contour of the building (40) in all its horizontal and vertical extension and whose combined advancement describes the topology of an ascending multiple helix.

In a second example of application for manufacturing a second floor of an on-site printed seismic-resistant building (40), the quadruped mobile robotic system (10) varies the height and orientation of the walking robotic cell (100), allowing it to move from one enclosure to another, even from the next higher or lower level of the building (40) under construction, avoiding obstacles such as walls, beams, reinforcement bars, and vertical ducts above, below, and in between them.

In a third example of application for manufacturing a second or superior floor of an on-site printed seismic-resistant building (40), the walking robotic cell (100) supports its locomotive legs (15) on conventional, motorized, or climbing scaffolds and preferably prefabricated slabs to print the inner and outer contour of the perimeter walls of the building (40).

In a fourth example of application for manufacturing a high-rise floor of an on-site printed seismic-resistant building (40), the walking robotic cell (100) supports its locomotive legs (15) on conventional, motorized, or climbing scaffolds and preferably prefabricated slabs, to print the inner and outer contour of the perimeter walls of the building (40).

The invention claimed is:

1. A walking robotic cell (100) for the manufacture of on-site printed buildings (40) using a multi-axis 3D printing system, characterized in that it comprises:
   a quadruped mobile robotic system (10), comprising a toroidal frame (11) that in a thickness of its interior contains on-board power, control, and navigation systems; on its inner face it supports piping (12); on its upper face supports three radial beams (13), equidistant from each other and concurrent in a hollow shaft zenithal node (14); on its lower face it supports a circular motion track (31), which is part of a multi-axis actuator (30); and on its perimeter face it has four locomotive legs (15) with four revolute joints, one prismatic joint, and three hydraulic or pneumatic reinforcements on each leg, to achieve a stable gait;
   a feeding device (20), comprising an external semi-rigid hose for conveying of material (21), which is connected by a hose coupling (22) to a flange of an extension tube (23), which is secured to a clamping ring (24), which is fixed to the hollow shaft zenithal node (14), and an inner drum of a hollow shaft rotary connector (25) is secured to said clamping ring (24), which diverts in at least a plurality of cables for power supply and control (26) and in at least a plurality of hoses for conveying of material (28), wherein the plurality of cables are protected by rotating cable trays (26*a*), which rotate in solidarity with an outer drum of the hollow shaft rotary connector (25) and with three or more carriages (31 *a*) of a circular motion track (31), and retractable rocker arms (26*b*) hang from their lower faces, and wherein the flange of an extension tube (23) runs vertically through the hollow shaft rotary connector (25) and is connected at its lower end to a multi-outlet rotary distributor (27), where three or more flexible hoses for conveying of material (28) are connected to three or more discharge outlets, which convey mortar to three or more interchangeable nozzles (29) with electronically controlled shut-off valves;
   a multi-axis actuator (30), which is a reprogrammable electromechanical system, automatically controlled, programmable offline or online in all its degrees of freedom from an external or remote computer, comprising a circular motion track (31) which is supported on the lower face of the toroidal frame (11) of the quadruped mobile robotic system (10) of the walking robotic cell (100), wherein the circular motion track (31) comprises three or more carriages (31*a*), which are respectively actuated by a motorized pinion (31*b*) and a rack (31*c*), and respectively guided by four bearing assemblies (31*d*) on two concentric guides (31*e*), and on each carriage (31*a*) a telescopic column (31*f*) is mounted, and on it a robot manipulator (31*g*) in inverted position, with all its plurality of cables for power supply and control (26) protected by a rotating cable tray (26*a*) and its plurality of hoses for conveying of material (28).

2. The walking robotic cell (100) according to claim 1, characterized in that it comprises at least four locomotive legs (15) with at least three degrees of freedom to achieve a stable gait.

3. The walking robotic cell (100) according to claim 1, characterized in that each of its four locomotive legs (15) has five degrees of freedom to achieve a stable gait.

4. The walking robotic cell (100) according to claim 1, characterized in that the inner drum of a hollow shaft rotating connector (25), which is a rotating device used for transferring electrical, hydraulic, or pneumatic power, analog or digital control circuits or data, and also media such as vacuum, cooling fluids, steam, and others, from one or multiple fixed inputs—in this case arranged on the inner drum—to one or multiple rotating outputs—in this case arranged on an outer drum—, diverts in at least a plurality of cables and for power and supply and control (26), and a plurality of hoses for conveying of material (28), which feed and communicate to three or more motorized pinions (31*b*), three or more telescopic columns (31*f*), and three or more robot manipulators (31*g*) towards an electricity generator or an installed electrical network, an external compressor and controller.

5. The walking robotic cell (100) according to claim 1, characterized in that the three or more flexible hoses for conveying of material (28), lead the mortar to three or more interchangeable nozzles (29) with electronically controlled shut-off valves mounted on a flange of the three or more robot manipulators (31*g*).

6. The walking robotic cell (100) according to claim 1, characterized in that the circular motion track (31) comprises three or more carriages (31*a*), which are respectively actuated by a motorized pinion (31*b*) and a rack (31*c*), and respectively guided by four bearing assemblies (31*d*) on two concentric guides (31*e*), and on each carriage (31*a*) a telescopic column (31*f*) is mounted, and on it a robot manipulator (31*g*) in inverted position, with all its plurality of cables for power supply and control (26) protected by a rotating cable tray (26*a*), and its plurality of hoses for conveying of materials (28).

7. The walking robotic cell (100) according to claim 1, characterized in that the building (40) printed on site by generating multiple helical paths of simultaneous deposition of continuous filaments of a cement mortar, is an initial manufacture stage of a first floor with reinforcement bars (40*a*) anchored to a foundation, vertical ducts preinstalled inside some walls, and sills installed or completed during a 3D printing process.

8. The walking robotic cell (100) according to claim 1, characterized in that the building (40) printed on site by generating multiple helical paths of simultaneous deposition of continuous filaments of a cement mortar, is an initial manufacture stage of a second floor with a preferably prefabricated slab (40*b*), to which the walking robotic cell (100) climbs, while moving over and between preinstalled reinforcement bars (40*a*), lap splices, and vertical ducts.

9. The walking robotic cell (100) according to claim 1, characterized in that the building (40) printed on site by generating multiple helical paths of simultaneous deposition of continuous filaments of a cement mortar, is a conventional, motorized, or climbing scaffold (40*c*), on which the walking robotic cell (100) supports one of its four locomotive legs (15) to print an inner and outer contour of the perimeter walls of a second floor with preinstalled reinforcement bars (40*a*) and vertical ducts.

10. The walking robotic cell (100) according to claim 1, characterized in that the building (40) printed on site by generating multiple helical paths of simultaneous deposition of continuous filaments of a cement mortar, is a conventional, motorized, or climbing scaffold (40d) on which the walking robotic cell (100) is partially supported to print an inner and outer contour of the perimeter walls of a fifth floor with preinstalled reinforcement bars (40a) and vertical ducts.

11. A method for operating a walking robotic cell (100) for manufacturing on-site printed buildings using a multi-axis 3D printing system, characterized in that it comprises;
   a) providing a walking robotic cell (100) comprising:
      a quadruped mobile robotic system (10), comprising a toroidal frame (11) that in a thickness of its interior contains on-board power, control, and navigation systems; on its inner face it supports piping (12); on its upper face supports three radial beams (13), equidistant from each other and concurrent in a hollow shaft zenithal node (14); on its lower face it supports a circular motion track (31), which is part of a multi-axis actuator (30); and on its perimeter face it has four locomotive legs (15) with four revolute joints, one prismatic joint, and three hydraulic or pneumatic reinforcements on each leg, to achieve a stable gait;
      a feeding device (20), comprising an external semi-rigid hose for conveying of material (21), which is connected by a hose coupling (22) to a flange of an extension tube (23), which is secured to a clamping ring (24), which is fixed to the hollow shaft zenithal node (14), and an inner drum of a hollow shaft rotary connector (25) is secured to said clamping ring (24), which diverts in at least a plurality of cables for power supply and control (26), and in at least a plurality of hoses for conveying of material (28), wherein the plurality of cables are protected by rotating cable trays (26a), which rotate in solidarity with an outer drum of the hollow shaft rotary connector (25) and with three or more carriages (31a) of a circular motion track (31), and retractable rocker arms (26b) hang from their lower faces, and wherein the flange of an extension tube (23) runs vertically through the hollow shaft rotary connector (25) and is connected at its lower end to a multi-outlet rotary distributor (27), where three or more flexible hoses for conveying of material (28) are connected to three or more discharge outlets, which convey mortar to three or more interchangeable nozzles (29) with electronically controlled shut-off valves; and
      a multi-axis actuator (30), which is a reprogrammable electromechanical system, automatically controlled, programmable offline or online in all its degrees of freedom from an external or remote computer, comprising a circular motion track (31) which is supported on the lower face of the toroidal frame (11) of the quadruped mobile robotic system (10) of the walking robotic cell (100), wherein the circular motion track (31) comprises three or more carriages (31a), which are respectively actuated by a motorized pinion (31b) and a rack (31c), and respectively guided by four bearing assemblies (31d) on two concentric guides (31e), and on each carriage (31a) a telescopic column (31f) is mounted, and on it a robot manipulator (31g) in inverted position, with all its plurality of cables for power supply and control (26) protected by a rotating cable tray (26a) and its plurality of hoses for conveying of material (28);
   b) commanding the quadruped mobile robotic system (10) of the walking robotic cell (100) to autonomously position and level itself, or to position and level it by remote operation, at an intended location on a construction site, with its feeding device (20) suitably connected to an external source of material and alternatively connected to power, control, and navigation systems to actuate its multi-axis actuator (30) by means of a program executed from an external or remote computer, and to initiate the on-site 3D printing of a building (40), whose construction components may have reinforcement bars (40a) and vertical ducts preinstalled inside them;
   c) actuating the three or more robot manipulators (31g) to position and orient the three or more interchangeable nozzles (29), at points preferably distal to an inner and an outer contour of the building (40) or a portion thereof ready to be printed, and starting with each one, in a same direction of advancement, a deposition of continuous filaments of a mortar in successive superimposed layers, according to a previous computational path design, which reproduces the inner and outer contour of the building (40) in all its horizontal and vertical extension, and whose combined advancement can describe topology of a multiple ascending helix that reduce a time elapsed between the deposition of each successive layer and thus avoid that a rapid initial setting prevent consecutive layers of mortar from adhering properly to each other, and wherein the three or more interchangeable nozzles (29) repeat the same path in each successive layer or, alternatively, each interchangeable nozzle (29) reproduces a different path and performs a different task, notwithstanding that, due to the design of the building (40) itself, the position and orientation of each interchangeable nozzle may vary in a next layer; and
   d) executing the program of the multi-axis actuator (30) from an external or remote computer, so that each carriage (31a) of the circular motion track (31) and each telescopic column (31f) mounted on each carriage (31a) independently positions each robot manipulator (31g) at required horizontal and vertical distances at each required instant, and each robot manipulator (31g) independently positions and orients the interchangeable nozzle (29) mounted on its flange at each required instant, according to a previous computational path design that reproduces the inner and outer contour of the building (40) in all its horizontal and vertical extension.

12. The method for operating a walking robotic cell (100), according to claim 11, characterized in that, in order to reconstruct a building (40) printed on site, with preinstalled reinforcement bars and ducts (40a) inside its walls, not exceeding a maximum height from which the robot manipulators (31g) can print, with the reinforcement bars duly anchored to a foundation (40b), the walking robotic cell (100) is commanded so that by means of its power, control, and navigation systems, it autonomously positions and levels itself at the intended location, and with its feeding device (20) previously connected to a mortar pump, its multi-axis actuator (30) is actuated by means of a program executed from an external or remote computer, to initiate the 3D printing of the inner and outer contour of a first floor of the building (40) in all its horizontal and vertical extension.

13. The method for operating a walking robotic cell (100), according to claim 11, characterized in that the external source of material is a mortar pump.

14. The method for operating a walking robotic cell (100), according to claim 11, characterized in that the power, control, and navigation systems are an electricity generator or an installed electrical network, an external compressor and controller.

* * * * *